(12) United States Patent
Iwasawa

(10) Patent No.: US 6,397,188 B1
(45) Date of Patent: May 28, 2002

(54) NATURAL LANGUAGE DIALOGUE SYSTEM AUTOMATICALLY CONTINUING CONVERSATION ON BEHALF OF A USER WHO DOES NOT RESPOND

(75) Inventor: Tohru Iwasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/357,663

(22) Filed: Jul. 20, 1999

(30) Foreign Application Priority Data

Jul. 29, 1998 (JP) .......................................... 98-213384

(51) Int. Cl.[7] .......................... G10L 15/18; G10L 15/22
(52) U.S. Cl. ....................................... 704/275; 704/257
(58) Field of Search ................................. 704/257, 275

(56) References Cited

U.S. PATENT DOCUMENTS

| | | | | |
|---|---|---|---|---|
| 4,305,131 A | * | 12/1981 | Best ............................ | 345/716 |
| 5,358,259 A | * | 10/1994 | Best ............................ | 463/31 |
| 5,393,073 A | * | 2/1995 | Best ............................ | 463/35 |
| 5,634,086 A | * | 5/1997 | Rtischev et al. ............. | 704/270 |
| 5,689,618 A | * | 11/1997 | Gasper et al. ............... | 704/276 |
| 5,727,950 A | * | 3/1998 | Cook et al. .................. | 434/350 |
| 5,748,841 A | * | 5/1998 | Morin et al. ................. | 704/257 |
| 5,873,057 A | * | 2/1999 | Eves et al. ................... | 704/201 |
| 5,964,593 A | * | 10/1999 | Cohen ......................... | 434/156 |
| 5,999,904 A | * | 12/1999 | Brown et al. ................ | 704/272 |
| 6,192,110 B1 | * | 2/2001 | Abella et al. ............. | 379/88.01 |
| 6,201,948 B1 | * | 3/2001 | Cook et al. .................. | 434/350 |

FOREIGN PATENT DOCUMENTS

| | | |
|---|---|---|
| JP | 05216618 A | 8/1993 |
| JP | 08166797 A | 6/1996 |
| JP | 10020884 A | 1/1998 |
| JP | 10031497 A | 2/1998 |

* cited by examiner

*Primary Examiner*—Tālivaldis Ivars Šmits
(74) *Attorney, Agent, or Firm*—Whitham, Curtis & Christofferson, P.C.

(57) ABSTRACT

A natural language conversation system is capable of making interaction between the user and the system smooth by continuing conversation with presenting guidance or with making the system to carry out speech for the user when user cannot response to presentation of the system to cause non-response, and can reduce load required for speech of user. The natural language conversation system includes conversation control portion for outputting data in a conversation scenario, and alternative conversation portion for alternatively inputting a preliminarily prepared natural language data to the conversation control means on behalf of a user when the user fails to input within a predetermined period.

18 Claims, 11 Drawing Sheets

FIG. 4

| STATE ID | 1 | |
|---|---|---|
| OUTPUT DATA | HELLO, WHAT WILL BE DONE FROM NOW OUT ? | |
| PAIR OF INPUTTABLE DATA AND STATE ID | DINNER | 2 |
| | ENTERTAINMENT | 3 |
| | SHOPPING | 4 |
| | END | 9 9 9 |

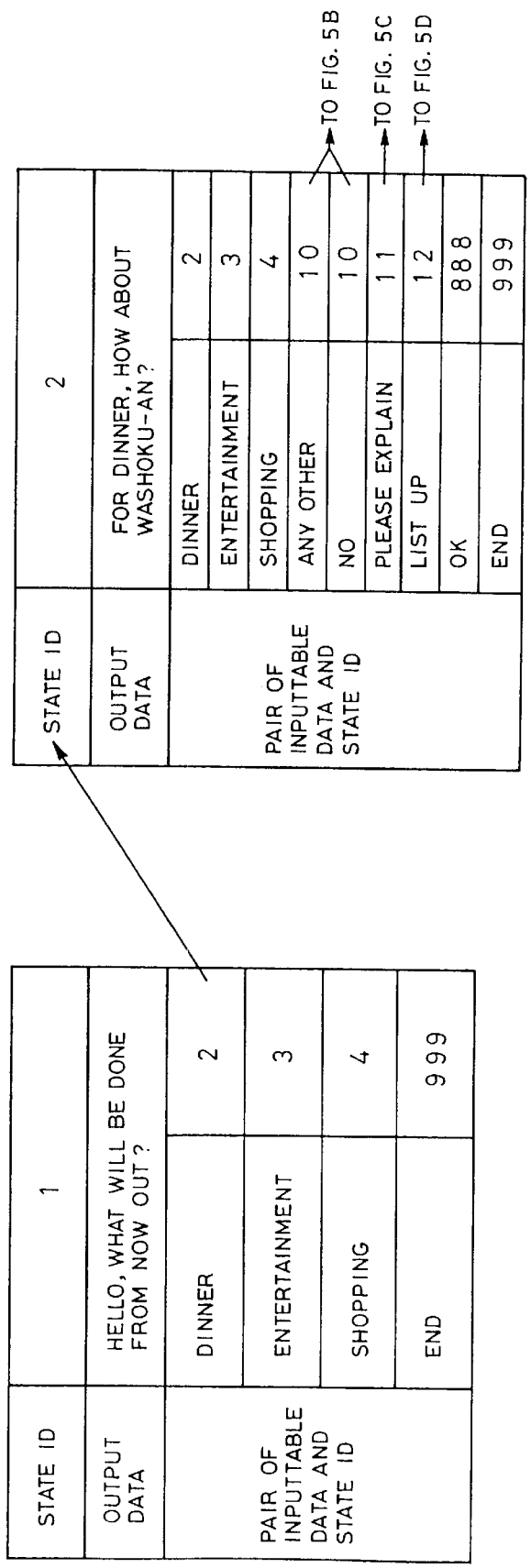

FIG. 5B

| STATE ID | 10 | |
|---|---|---|
| OUTPUT DATA | FOR DINNER, HOW ABOUT CHINA HANTEN? | |
| PAIR OF INPUTTABLE DATA AND STATE ID | DINNER | 2 |
| | ENTERTAINMENT | 3 |
| | SHOPPING | 4 |
| | ANY OTHER | 20 |
| | NO | 20 |
| | PLEASE EXPLAIN | 21 |
| | LIST UP | 22 |
| | OK | 888 |
| | END | 999 |

FIG.5C

| STATE ID | 11 |
|---|---|
| OUTPUT DATA | WASHOKU-AN IS RESTAURANT FOR TEA-CEREMONY DISHES? HOW ABOUT THIS? |
| PAIR OF INPUTTABLE DATA AND STATE ID | DINNER — 2 <br> ENTERTAINMENT — 3 <br> SHOPPING — 4 <br> ANY OTHER — 10 <br> NO — 10 <br> PLEASE EXPLAIN — 11 <br> LIST UP — 12 <br> OK — 888 <br> END — 999 |

| STATE ID | 888 |
|---|---|
| OUTPUT DATA | OK, ENJOY IT |
| PAIR OF INPUTTABLE DATA AND STATE ID | HELLO — 1 |

FIG.5D

| STATE ID | 12 | |
|---|---|---|
| OUTPUT DATA | FOR DINNER, THESE ARE CHOICES OF WASHOKU-AN AND CHINA HANTEN WHICH DO YOU PREFER? | |
| PAIR OF INPUTTABLE DATA AND STATE ID | WASHOKU AN | 3 0 |
| | CHINA HANTEN | 3 1 |
| | PLEASE EXPLAIN ABOUT WASHOKU-AN | 3 0 |
| | PLEASE EXPLAIN ABOUT CHINA HANTEN | 3 1 |
| | ANY OTHER | 3 2 |
| | END | 3 3 |
| | | |

FIG.6

| STATE ID | ALTERNATIVE INPUT DATA |
|---|---|
| 1 | — |
| 2 | PLEASE EXPLAIN |
| 3 | PLEASE EXPLAIN |
| 4 | PLEASE EXPLAIN |
| 10 | PLEASE EXPLAIN |
| 11 | ANY OTHER |
| 12 | PLEASE EXPLAIN ABOUT WASHOKU-AN |
| 888 | — |
| 999 | — |

FIG.7

| STATE ID | ALTERNATIVE INPUT DATA |
|---|---|
| 1 | — |
| 2 | LIST UP |
| 3 | LIST UP |
| 4 | LIST UP |
| 10 | PLEASE EXPLAIN |
| 11 | LIST UP |
| 12 | PLEASE EXPLAIN ABOUT WASHOKU-AN |
| 888 | — |
| 999 | — |

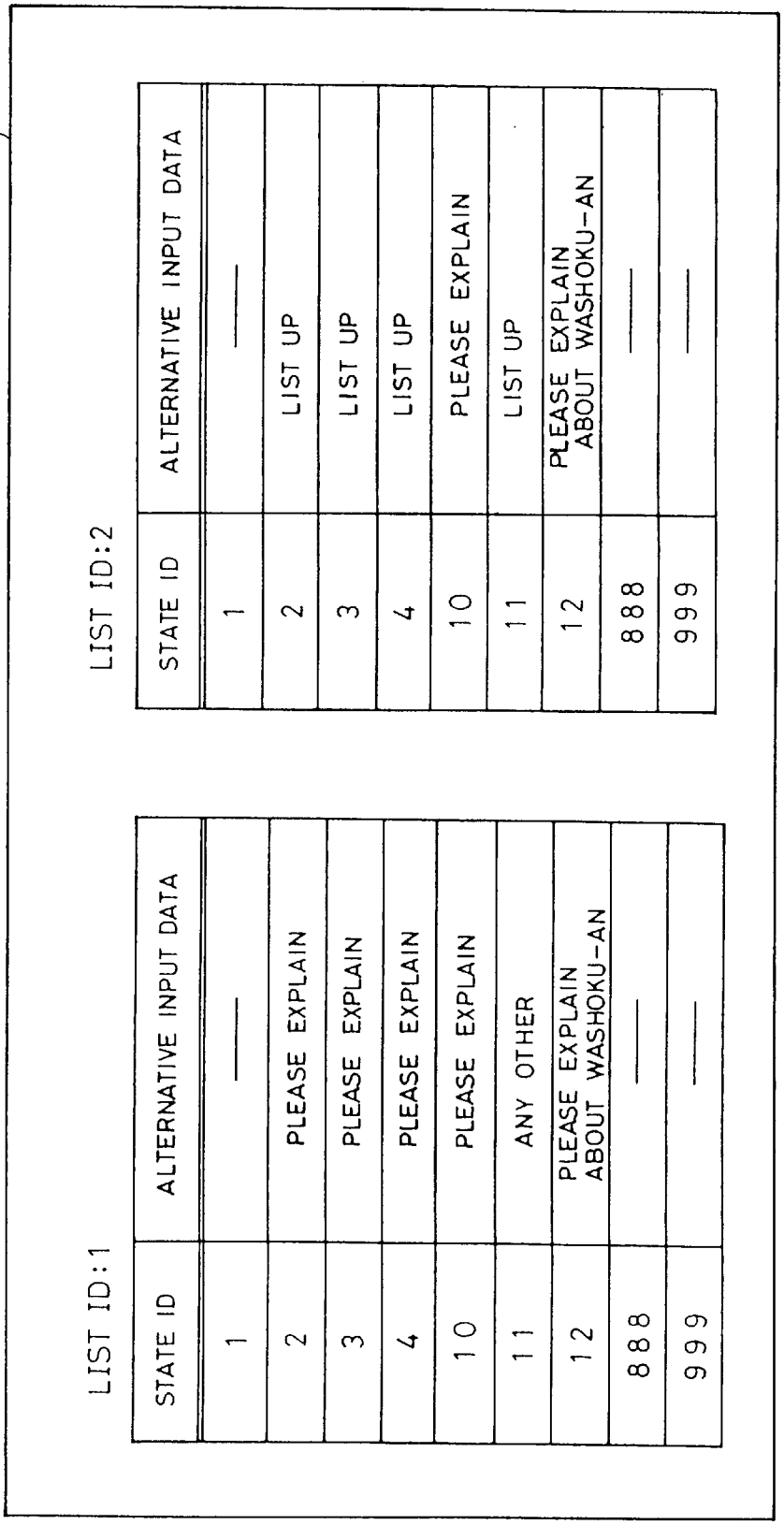

NATURAL LANGUAGE DIALOGUE SYSTEM AUTOMATICALLY CONTINUING CONVERSATION ON BEHALF OF A USER WHO DOES NOT RESPOND

BACKGROUND OF THE INVENTION

1. Field of the Invention

The present invention relates generally to a natural language dialogue system. More particularly, the invention relates to a system for conversation with a speaker displayed on a display screen of a computer, such as an anthropomorphic character by a natural language input, which can be via voice or keyboard.

2. Description of the Related Art

In the conventional technology of a speech conversation using a anthropomorphic character, such as that disclosed in Japanese Unexamined Patent Publication No. Heisei 5-216618, it is a primary system to provide the anthropomophic character in a system for establishing conversation between the system and a user one-on-one. In conversation through such conventional system, conversation is progressed by alternate speech of the system and user.

On the other hand, in Japanese Unexamined Patent Publication No. Heisei 10-31497, Japanese Unexamined Patent Publication No. Heisei 10-20884 and Japanese Unexamined Patent Publication No. Heisei 8-166797, there have been proposed systems providing speech guidance relating to candidates of next speech from the system to the user in order to make conversation between the system and the user smooth.

In the foregoing prior art, the user is inherently required to respond to the speech of the system. Therefore, when the user cannot react (respond) to proposal and inquiry from the system, conversation is inherently stopped. On the contrary, in the system where guidance messages are constantly spoken by the system side, speech of the system inherently becomes long for the guidance messages to degrade smoothness of progress of conversation. On the other hand, concerning application to perform information retrieval through speech conversation, since speech of the user is frequently required in the system, in which response of the user to the inquire of the system is inherent, load on the user becomes significant. Moreover, it should be difficult to list items for selection and select the item only by voice in speech conversation system.

SUMMARY OF THE INVENTION

The present invention has been worked out in view of the drawbacks in the prior art set forth above. Therefore, it is an object of the present invention to provide a natural language conversation system which can make interaction between the user and the system smooth by continuing conversation with presenting guidance or with making the system to carry out speech for the user when user cannot response to presentation of the system to cause non-response, and can reduce load required for speech of user.

According to the first aspect of the present invention, a natural language conversation system comprises:

conversation control means for outputting data in a conversation scenario; and alternative conversation means for alternatively inputting a preliminarily prepared natural language data to the conversation control means on behalf of a user when the user fails to input within a predetermined period.

According to the second aspect of the present invention, a storage medium storing a natural language conversation program operating a computer as conversation control means for outputting data in a conversation scenario, and alternative conversation means for alternatively inputting a preliminarily prepared natural language data to the conversation control means on behalf of a user when the user fails to input within a predetermined period.

In the preferred construction, the conversation control means may include holding means for holding a current state data indicative where a current state is in the conversation scenario, and the alternative conversation means may include an alternative input list containing a plurality of preliminarily prepared natural language data corresponding to the conversation scenario and means for selecting one of the natural language data depending up the current state data held in the holding means.

In short, the present invention implements presentation of a guide or performs alternative conversation in the system on behalf of the user for reducing load on the user for conversation, when the user cannot react on the presentation made by the system.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 4 is an illustration showing an example of a conversation condition data in a conversation scenario in FIG. 1;

FIGS. 5A to 5D are illustrations showing an example of a conversation scenario in FIG. 1;

FIG. 6 is an illustration showing an example of a alternative input list in FIG. 1;

FIG. 7 is an illustration showing another example of a alternative input list in FIG. 1;

FIG. 9 is an illustration showing an example of an alternative input list storage portion in FIG. 8.

DESCRIPTION OF THE PREFERRED EMBODIMENT

Figure 1:
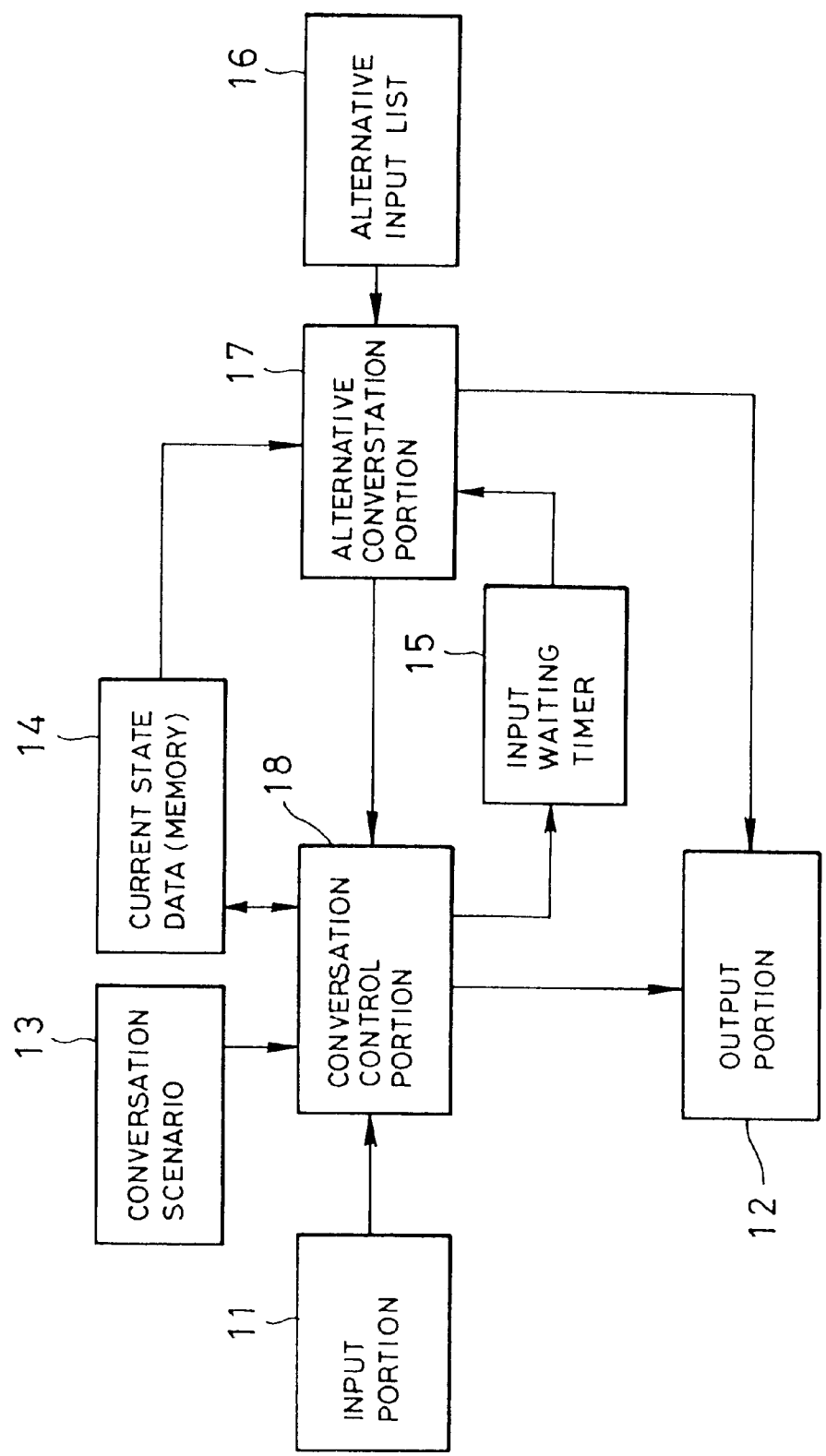
FIG. 1 is a block diagram showing a construction of the first embodiment of a natural language conversation system according to the present invention.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention. It should be noted that like components in respective drawings would be identified by like reference numerals.

FIG. 1 is a block diagram showing the first embodiment of a natural language conversation system according to the present invention. In FIG. 1, the first embodiment of the natural language conversation system is constructed with an input portion 11 receiving a natural language input from user, an output portion 12 outputting an output data from a system through an external output device, a conversation scenario 13 describing scenario of entire conversation using state data expressed by a state ID, the output data, an inputtable data, a state ID corresponding to the inputtable data, and a current state data(memory) 14 storing a position in a current conversation scenario.

On the other hand, in FIG. 1, the natural language conversation system is constructed with an input waiting timer 15 waiting input of the user for a given period after presentation of information to the user, an alternative input list 16 storing data to be alternatively input on behalf of the user when the user does not react to the information presentation, corresponding to respective state of the conversation scenario 13, a alternative conversation portion 17 issuing an input message for controlling conversation on behalf of the user when the user does not react, and a conversation control portion 18 for performing control of entire conversation. The input waiting timer 15 waits for input from the user for a preliminarily set period to output a time out signal to the alternative conversation portion 17 upon failure of receiving input within the pre-set period.

Here, the operation of the alternative conversation portion 17 will be discussed with reference to a flowchart shown in FIG. 2. At first, the state ID indicative of the current state data in the current conversation scenario from the current state data 14 is obtained (step S1).

Next, the alternative input list 16 is retrieved with taking the obtained conversation state ID as a key (step S2). Here, check is performed whether the alternative input message corresponding to the conversation state ID is present or not (step S3). When the alternative input message is present, the alternative input message is obtained (step S4). After outputting to the output portion 12 (step S5), the alternative input message is transferred to the conversation control portion 18 (step S6).

Next, operation of the conversation control portion 18 will be discussed with reference to a flowchart of FIG. 3. At first, the input message transferred as input upon starting retrieves the inputtable data contained in the current state data 14 (step S7) to check whether the data to match with the input message is present in the inputtable data or not (step S8). If no inputtable data matching with the input message is present, judgement is made that the input message is inappropriate in the current state to output an error message (step S13). Thereafter, process goes end.

When the inputtable data matching with the input message is present, the state ID corresponding to the inputtable data to be matched is obtained (step S9). The state data of the obtained ID is obtained from the conversation scenario 13 to update the current state data 14 (step S10). After outputting the output data stored in the current state data 14 to the output portion 12 (step S11), the input waiting timer 15 is set (step S12).

Next, the first embodiment of the natural language conversation system will be discussed in detail in the case where the conversation scenario is practically prepared utilizing an example of simple retrieval of information article. The conversation system used in this example is the conversation system which presents example of articles satisfying the command condition input by the user and appropriately modifies and re-presents the articles depending upon reaction of the user.

FIG. 4 is an example of the conversation state data in the conversation scenario 13. The conversation state illustrated in FIG. 4 is identified by the state ID "1". Upon transition to this state, the system outputs data of the message "hello, what will be done from now out?", and in this condition, it is assumed that there are four input command for "dinner", "entertainment", "shopping", "end". State ID after inputting respective command is respectively "2", "3", "4" and "999".

A part of the conversation scenario 13 generated by preparing a plurality of such state data are shown in FIGS. 5A to 5D. In this example, in the initial state, the state ID is "1". Here, when "dinner" is input, the state is transit to the state ID "2". If "any other" or "No" is input, the state ID becomes "10". If "please explain" is input, the state transits to state ID "11". On the other hand, if "list up" is input, the state ID transits to state "12".

Next, the alternative input list 16 in the foregoing example will be shown. At first, immediately after initiation of operation in the initial state ID "1", since the input of the user is not obtained, nothing will be done. In transition state after inputting of "dinner" by the user, if nothing is input by the user for the given period, "please explain" is output on behalf of the user. The same is true even in the case where the user selects "entertainment" or "shopping". In case of the explaining state of recommended item in the state ID "11", "any other" is output for requiring retrieval of the next item. In the manner set forth above, output data in the alternative conversation portion 17 corresponding to all of the state ID are described.

Next, process flow of the first embodiment of the natural language conversation system will be discussed in detail in terms of the conversation scenario 13 as illustrated in FIGS. 5A to 5D and the alternative input list 16 in FIG. 6.

At first, in the state represented by the state ID "1" of FIG. 4, when the user inputs "dinner" through the input portion 11, the input "dinner" is transferred to the conversation control portion 18. In the conversation control portion 18, the inputtable data which can be input in response to the state data representative of the state ID "1" is checked and state data of the state ID=2 as the state after state transition in response to the input of "dinner" is obtained to store in the current state data(memory) 14.

Next, in the conversation control portion 18, after outputting an output data "for dinner, how about Washoku-an?" to the output portion 12, the input waiting timer 15 is set. If not input is made by the user for a given period and thus the input waiting timer 15 detects time out, the alternative conversation portion 17 is called. In the alternative conversation portion 17 performs retrieval against the alternative input list with taking the state ID "2" corresponding to the input of "dinner", to obtain the alternative input data "please explain".

After outputting "please explain" obtained as the alternative input data to the output portion 12, the alternative conversation portion 17 transfers the obtained alternative input data to the conversation control portion 18. The conversation control portion 18 inputs "please explain" to perform conversation control. Then, the system outputs "Washoku-an is a restaurant for tea-ceremony dishes". How about this?" corresponding to the state ID "11"

Capability of automatically continuing conversation between the conversation control portion 18 and the alternative conversation portion 17 even when the user inputs nothing, is the feature of the present invention. As a result, conversation as in the following example of conversation can be performed. In the following example, "system A" represents output from the conversation control portion 18 and "system B" represents output from the alternative conversation portion 17.

User: "Dinner"

System A: "For dinner, how about Washoku-an?"

User: ". . . " (no reaction)
System B: "Please explain."
System A: "Washoku-an is a restaurant for tea-ceremony dishes.
Are you take this?"
User: ". . . " (no reaction)
System B: "Any other?"
System A: "For dinner, how about China Hanten?"
User: ". . . " (no reaction)
System B: "Please explain."
System A: "China Hanten is a restaurant for Beijing dishes.
Are you take this?"
User: "OK"
System A: "Well, please enjoy dinner."

As set forth above, by employing a system, in which the system may alternatively input response message on behalf of the user, list-up type conversation simultaneously presenting a plurality of data which has been considered to cause substantial load on the user in the conventional conversation system, can be easily implemented.

FIG. 7 shows am example of the alternative input list 16 upon performing list-up type conversation. Using the alternative input list shown in FIG. 7, the following conversation can be implemented.

User: "Dinner"
System A: "For dinner, how about Washoku-an?"
User: ". . . " (no reaction)
System B: "List up."
System A: "For dinner, these are choices of Washoku-an and China
Hanten. Which do you prefer?"
User: ". . . " (no reaction)
System B: "Please explain about Washoku-an"
System A: "Washoku-an is a restaurant for tea-ceremony dishes.
Are you take this?"
User: ". . . " (no reaction)
System B: "Please explain about China Hanten."
System A: "China Hanten is a restaurant for Beijing dishes.
Are you take this?"
User: "OK"
System A: "Well, please enjoy dinner."

Figure 8:
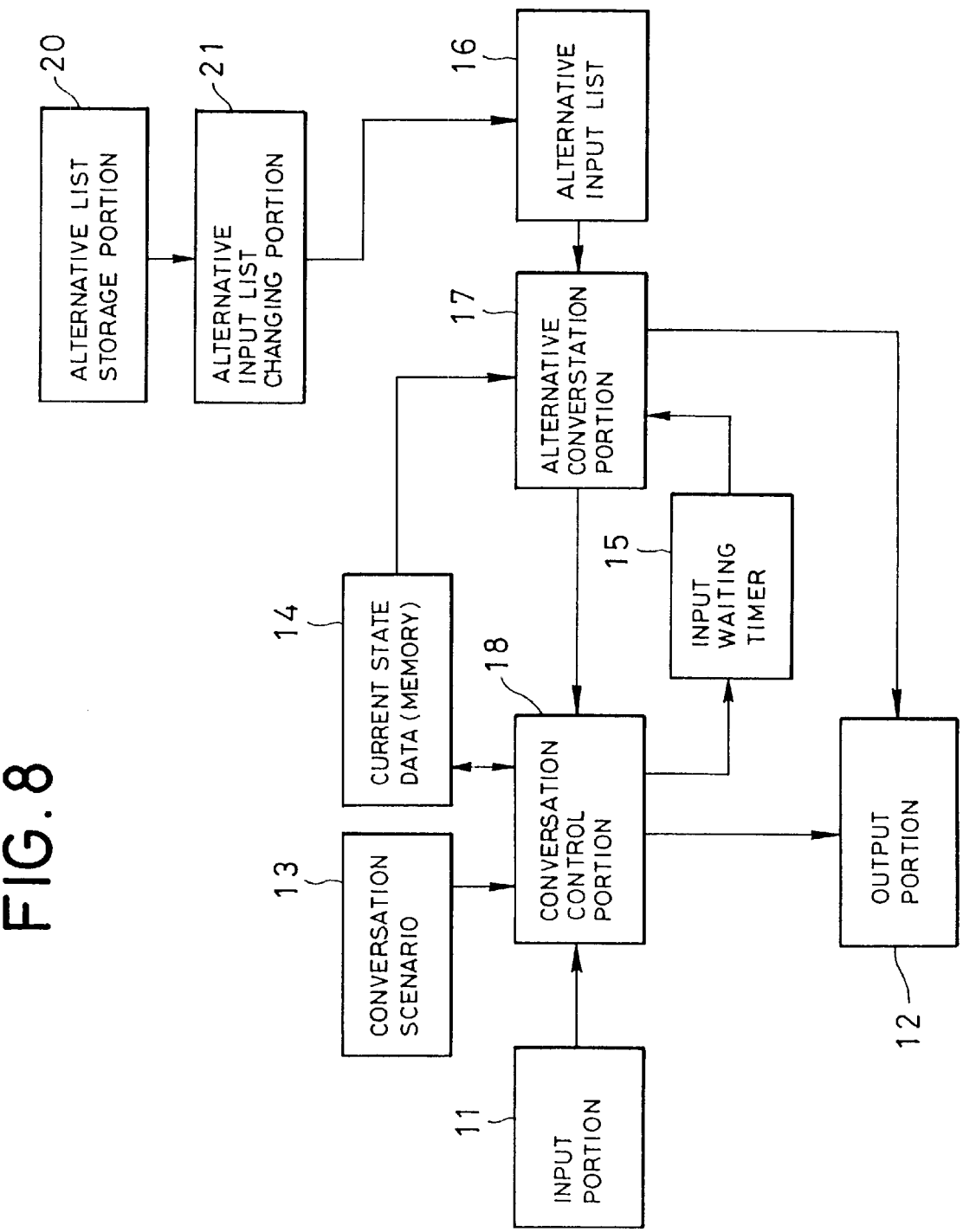
FIG. 8 is a block diagram showing a construction of the second embodiment of a natural language conversation system according to the present invention.

Next, the second embodiment of the natural language conversation system according to the present invention will be discussed with reference to FIG. 8. The shown embodiment of the natural language conversation system is constructed with an alternative input list storing portion 20 storing a plurality of kinds of alternative input messages as applicable alternative inputs in a form of a template, and an alternative input list changing portion 21 receiving the input by the user, selecting the list depending upon the input of the user from the alternative input list storing portion 20 for storing in the alternative input list 16, in addition to the construction of the first embodiment of the natural language conversation system shown in FIG. 1.

An example of the alternative input list storing portion 20 is shown in FIG. 9. Here, the alternative input list 16 shown in FIGS. 6 and 7 employed in the first embodiment is stored in the alternative list storing portion 20. When the user selects a list identified by a list ID "1" in the alternative input list changing portion 21, the alternative input list changing portion 21 obtains the list identified by the list ID "1" of FIG. 9 to replace the alternative input list 16. Changing of the alternative input list as set forth above is effective even during conversation. Using the example of the conversation scenario 13 used in the first embodiment, the list identified by the list ID "1" is used initially, and the list is switched to a list identified by the list ID "2", the following conversation can be implemented.

User: "Dinner"
System A: "For dinner, how about Washoku-an?"
User: ". . . " (no reaction)
System B: "Please explain."
System A: "Washoku-an is a restaurant for tea-ceremony dishes.
Are you take this?"
User: ". . . " (no reaction)
(Here, the alternative input list is assumed to be switched from the list of the list ID "1" to the list of the list ID "2".)
System B: "List up."
System A: "For dinner, these are choices of Washoku-an and China
Hanten. Which do you prefer?"
User: ". . . " (no reaction)
System B: "Please explain about Washoku-an"
System A: "Washoku-an is a restaurant for tea-ceremony dishes.
Are you take this?"
User: ". . . " (no reaction)
System B: "Please explain about China Hanten."
System A: "China Hanten is a restaurant for Beijing dishes.
Are you take this?"
User: "OK"
System A: "Well, please enjoy dinner."

As set forth above, by providing a changing function to select the alternative input lists 16 according to a command input by the user, alternative conversation method can be changed depending upon conversation condition and preference of the user.

The input portion 11 in the first and second embodiment discussed above can be an input device, such as a keyboard or so forth or a speech input device, such as a microphone or the like. Concerning a speech data input from the speech input device, it has to be converted into a character data. On the other hand, as a method for outputting to the external output device in the output portion, there are a method to display an output message in a form of a text message on a display screen of the image display device, such as a display device or the like, and a method utilizing a speech output device converting the text form output message data into the speech data by using a Text To Speech (TTS) function.

On the other hand, when the visual display device is employed as the external output means of the output portion 12 in the first and second embodiments, it may be possible to make the output of the system distinct from the output resulting from the alternative input by outputting the output message output via the conversation control portion 18 as the visual display method and the output message output via the alternative conversation portion 17 at different position on the display screen. For example, by displaying two image characters with balloon on the display screen, the output messages respectively corresponding to the output of the system and the output resulting from the alternative input, may be displayed in the balloons.

Similarly, in the case where an audio output device is employed in the output portion 12 in the first and second embodiments, the output message output via the conversation control portion 18 and the output message output via the alternative conversation portion 17 may be distinguished from each other by differentiating voices. For example, by providing two image characters with moving mouth on the display screen, respective output messages may be spoken in different voices (such as male voice and female voice).

Figure 2:
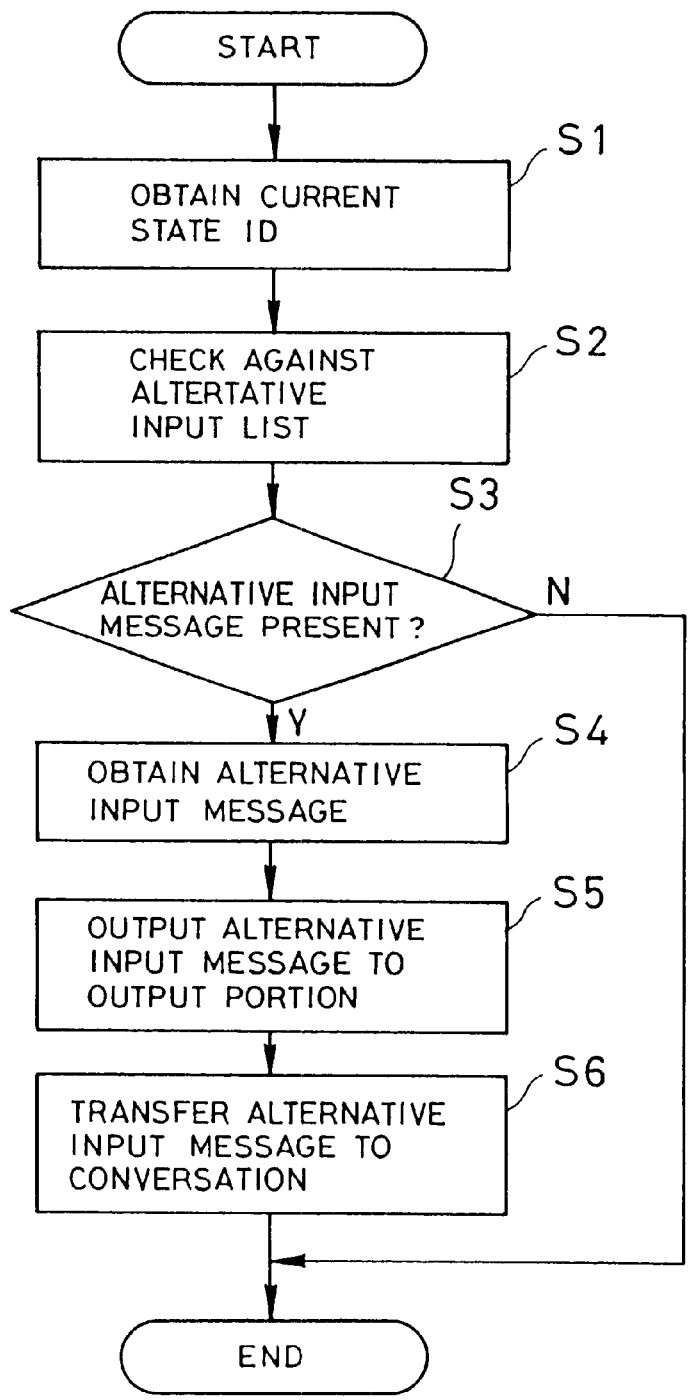
FIG. 2 is a flowchart showing operation of an alternative speech portion in FIG. 1.
Figure 3:
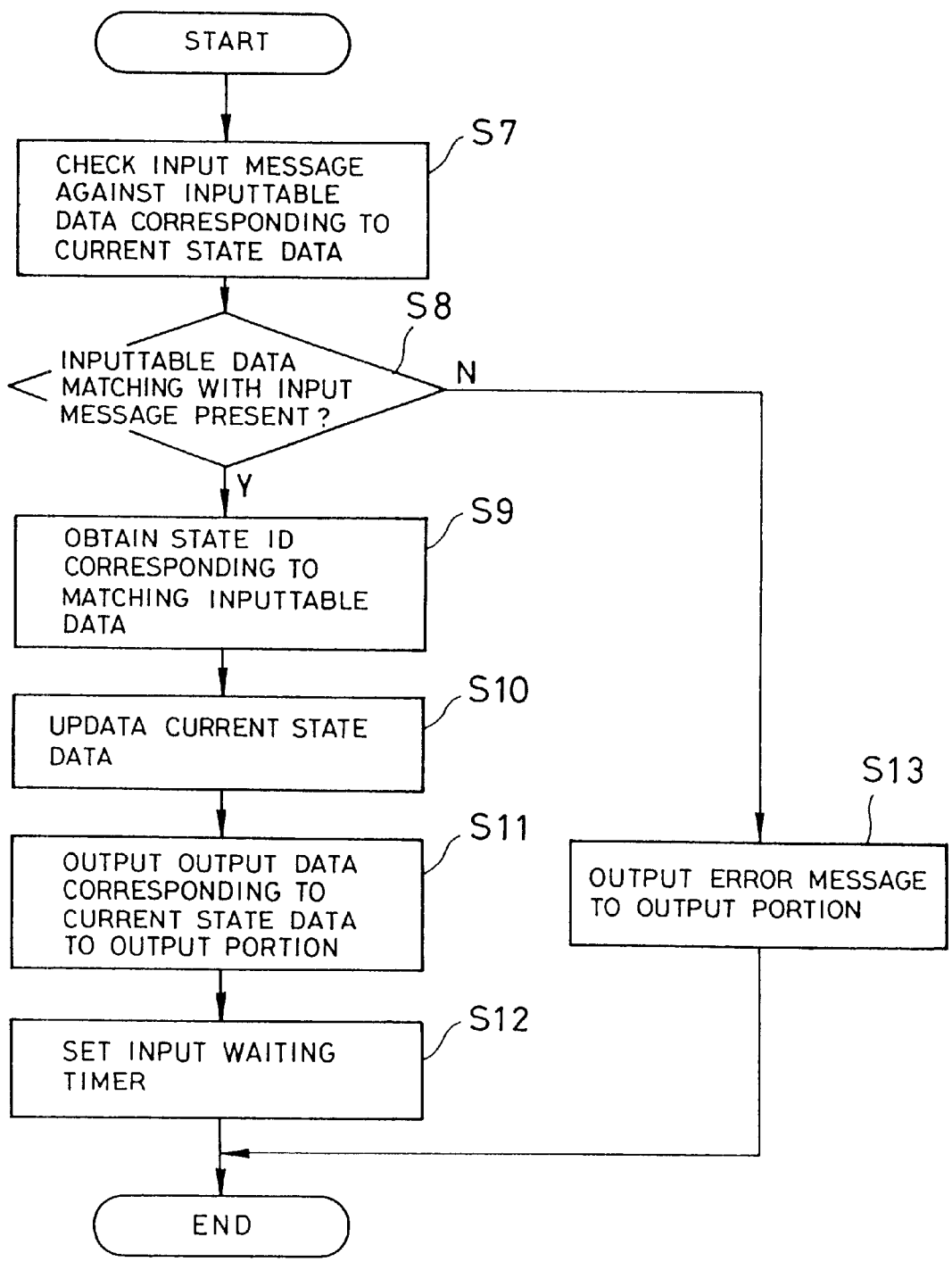
FIG. 3 is a flowchart showing operation of a conversation control portion in FIG. 1.

It should be obvious that the natural language conversation operation equivalent to those in the foregoing first and second embodiments may be possible by controlling a computer with a program stored in a storage medium for implementing the process of FIGS. 2 and 3 set forth above. The storage medium may be various kinds, such as semiconductor memory, a magnetic disk or so forth.

As set forth above, according to the natural language conversation system of the present invention, a speaking character aiding the user is provided in the system in addition to the speaking character presenting information. Thus, when the user is held not responsive for a given period, the speaking character aiding the user may input a speech for retrieval of database on behalf the user or present candidate of possible next speech depending upon the conversation state. As a result, conversation between the system and the user becomes smooth, and the load on the user can be reduced.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A natural language conversation system comprising:
   conversation control means for outputting data in a conversation scenario; and
   alternative conversation means for automatically inputting a preliminarily prepared natural language data to said conversation control means on behalf of a user to continue an interactive computer-user conversation when said user fails to input within a predetermined time.

2. A natural language conversation system as set forth in claim 1, wherein said conversation control means includes holding means for holding a current state data indicative where a current state is in said conversation scenario, and said alternative conversation means includes an alternative input list containing a plurality of preliminarily prepared natural language data corresponding to said conversation scenario and means for selecting one of said natural language data depending on said current state data held in said holding means.

3. A natural language conversation system as set forth in claim 2, wherein a plurality of said alternative input lists are provided to be used selectively depending upon instruction by the user.

4. A natural language conversation system as set forth in claim 2, wherein said current state data held in said holding means is updated depending upon content of input by the user.

5. A natural language conversation system as set forth in claim 1, wherein the natural language data input by the user is a character data input by means of a character input device.

6. A natural language conversation system as set forth in claim 1, wherein the natural language data input by the user is a speech data input by means of a speech input device, and said system further comprises character data conversion means for converting said speech data into a character data.

7. A natural language conversation system as set forth in claim 1, wherein said conversation control means outputs data in said conversation scenario for displaying.

8. A natural language conversation system as set forth in claim 7, wherein said conversation control means also outputs the natural language data input by said alternative conversation means to said conversation control means for displaying.

9. A natural language conversation system as set forth in claim 8, wherein said data in said conversation scenario and the natural language data, which said alternative conversation means made said conversation control means to input, are displayed at different positions on a display screen relative to each other.

10. A natural language conversation system as set forth in claim 1, wherein said conversation control means includes speech data converting means for converting data in said conversation scenario into a speech data for outputting speech data after conversion.

11. A natural language conversation system as set forth in claim 10, wherein said conversation control means also outputs the natural language data, which said alternative conversation means made said conversation control means to input, as a speech output.

12. A natural language conversation system as set forth in claim 11, wherein the speech data after conversion by said speech data converting means and said natural language data to be input to said conversation control means are output in mutually distinct voices.

13. A storage medium storing a natural language conversation program operating a computer as conversation control means for outputting data in a conversation scenario, and alternative conversation means for automatically inputting a preliminarily prepared natural language data to said conversation control means on behalf of a user to continue an interactive computer-user conversation when said user fails to input within a predetermined period.

14. A storage medium as set forth in claim 13, wherein said conversation control means holds a current state data indicative where a current state is in said conversation scenario, and said alternative conversation means includes an alternative input list using a plurality of preliminarily prepared natural language data corresponding to said conversation scenario and means for selectively inputting one of said plurality of natural language data to said conversation control means depending upon said current state data.

15. A storage medium as set forth in claim 14, wherein a plurality of said alternative input lists are provided to be selectively used depending upon instruction by the user.

16. A storage medium as set forth in claim 13, wherein the held current state data is updated depending upon the content of the input by the user.

17. A storage medium as set forth in claim 13, wherein the natural language data input by the user is a character data input by means of a character input device.

18. A storage medium as set forth in claim 13, wherein the natural language data input by the user is a speech data input by means of a speech input device, and said system further comprises character data conversion means for converting said speech data into a character data.

* * * * *